Oct. 8, 1929.  S. S. MATTHES  1,731,170
OVERHEAD TROLLEY SYSTEM
Filed June 9, 1927
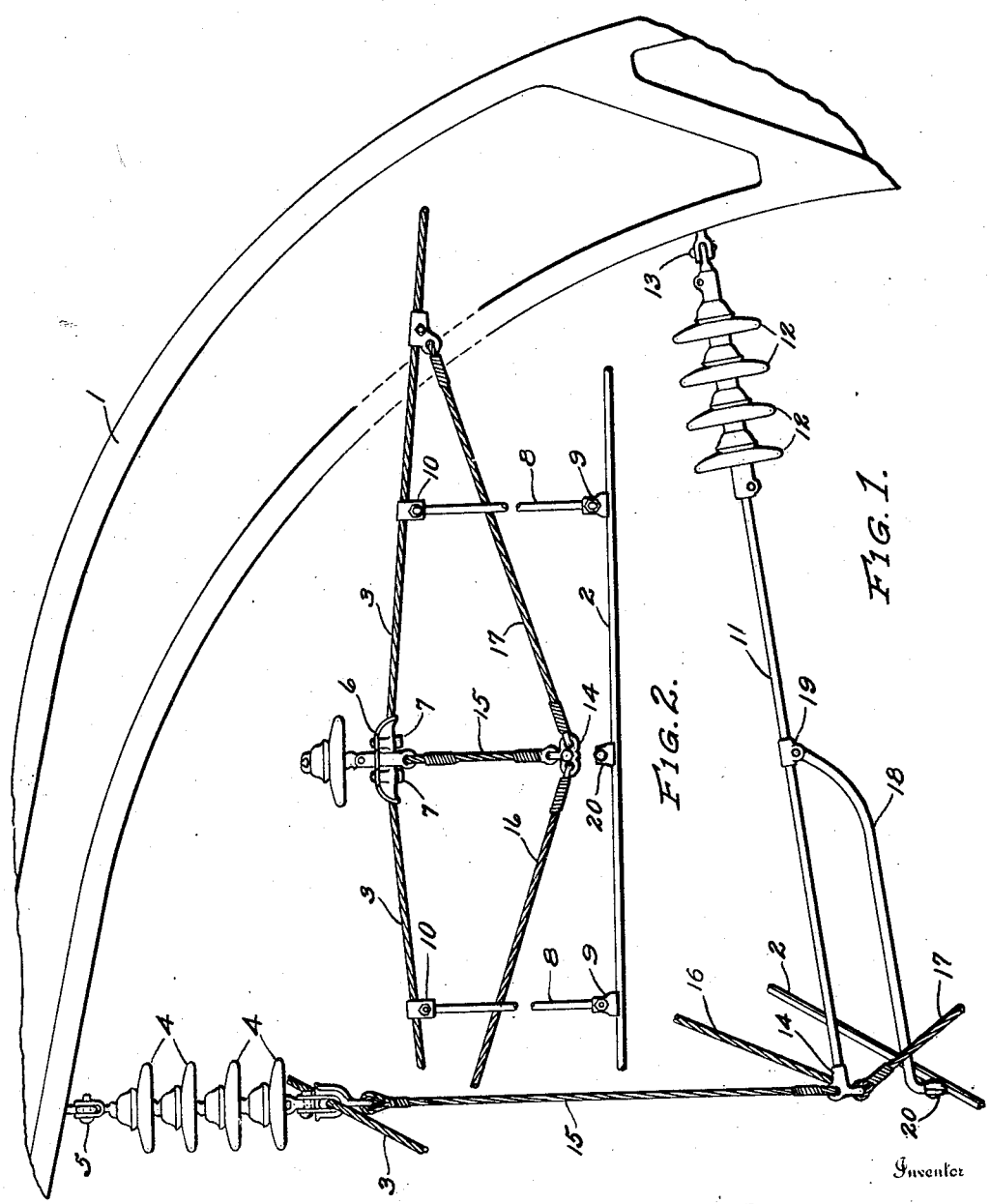
Inventor
SAMUEL S. MATTHES
By
Attorney Patented Oct. 8, 1929

1,731,170

UNITED STATES PATENT OFFICE

SAMUEL S. MATTHES, OF MANSFIELD, OHIO, ASSIGNOR TO THE OHIO BRASS COMPANY, OF MANSFIELD, OHIO, A CORPORATION OF NEW JERSEY

OVERHEAD TROLLEY SYSTEM

Application filed June 9, 1927. Serial No. 197,747.

My invention relates to an overhead trolley system and particularly to that class of systems in which the trolley wire is suspended from a messenger cable and known as a catenary system.

The object of my invention is to provide a system which is flexible but strong in resisting wind pressure, and in which movement of the messenger cable and trolley is reduced to a very small amount.

My invention resides in the new and novel construction, combination and relation of the various parts hereinafter fully described and shown in the accompanying drawing.

In the drawing:

Fig. 1 is a view in slight perspective looking along the trolley and messenger cable, and setting forth the method of suspension of the messenger and trolley wire from the fixed supports.

Fig. 2 is a side view showing the attachment of the messenger cable to its support and adjacent hanger supports for the trolley wire.

In the preferred embodiment of my invention, I employ a fixed support 1, which may be in the form of a structural steel tower, a pole with a horizontally disposed arm or a bridge construction spanning the tracks and trolley wire. These various forms of fixed supports are well known to those skilled in the art, and the particular form shown in the drawing is that of a structural steel construction in which the upright portion is formed with the arch or bow shaped arm 1 extending over the conductors to be supported.

2 represents the trolley wire, usually suspended at a fixed distance above the track and midway between the rails.

3 is a messenger cable suspended from the support 1 at fixed distances, and the intervening portion of the cable hangs in a catenary curve, from whence the system receives its name.

The messenger cable 3 is usually uninsulated with respect to the trolley wire, as it can act as a feeder to the trolley wire, and it is connected to the trolley wire through metallic hangers, therefore the messenger cable 3 must be insulated from the support 1, which is usually of metal and grounded. For this purpose I employ one or more insulators 4, depending upon the voltage upon the cable 3. These insulators may be in various well known types, and in the drawing I have shown what is known on the market as a suspension unit. The top unit is connected to the support 1 by means of the clevis and eye bolt attachment 5, and to the lower end of the lower unit is secured a cable clamp 6 which directly supports the cable 3, the clamp 6 forming a saddle in which the messenger cable rests, and it is clamped in position against longitudinal movement relative to the clamp by means of the hook bolts 7. The trolley wire is suspended from the messenger cable by means of hangers 8, to the ends of which are secured clamps 9 and 10 for engaging the trolley wire and the messenger cable respectively. These hangers are spaced varying distances apart between the cable clamps 6 and vary in length, depending upon the dip or sag of the cable 3, so as to maintain the trolley wire 2 at a fixed distance above the track. The distance between the hanger 8 may be anywhere from five to fifteen feet, but a distance of ten feet between hangers makes a very practical spacing, and maintains the trolley wire 2 in a substantially straight line devoid of dips between the hangers 8.

In order to prevent lateral or side movement of the trolley wire 2 due to wind pressure or the effect of the current collector upon a moving train, I employ a steady device, which comprises a steady arm 11 secured to a series of insulators 12, and which is shown in the drawing as comprising four units, the end of one extreme unit being flexibly secured to the support 1 by means of the eye bolt and clevis fitting 13, and the rod 11 is secured at the end of the opposite unit. These insulating units are rigidly secured together.

The outer end of the arm 11 is provided with an eye member 14 to which is secured a supporting cable 15 having one end secured to the cable clamp 6. The cable 15 supports the outer end of the steady arm 11 thereby avoiding the necessity of a rigid joint at the fitting 13, making a much more pliable, easily constructed and safe arrangement. In order to prevent swaying of the outer end of the member 11 in a longitudinal direction, strain wires 16 and 17 may be run from the fitting 14 and secured to the messenger cable 3 at points distant from the cable clamp 6.

In order to prevent the lateral swaying of the trolley wire, I provide the arm 11 with an auxiliary arm 18 pivotally secured to the arm 11 by means of the eye fitting 19. The opposite end of the arm 18 is pivotally secured to a trolley wire clamp 20. This form of steady construction prevents lateral swaying of the trolley wire, which is advisable, especially in cases where a wheel trolley is used, and at the same time permits the trolley wire at this point to rise and fall with the passing of the current collector.

The system described provides a simple and light construction and sufficiently rigid so as to resist extreme movement from external forces and yet provide flexibility to the trolley wire.

There are modifications which will suggest themselves to those skilled in the art, but I wish to be limited only by my claims.

I claim:

1. A trolley system comprising a support, a trolley wire, a messenger cable suspended from the support and extending in both directions from the support, insulating members interposed in a suspension for the messenger cable from the support and a cable clamp secured to the suspension and the messenger cable, hangers for suspending the trolley wire from the cable and disposed along the messenger cable at predetermined points and secured to the cable and trolley wire and of varying lengths to maintain the trolley wire in a substantially straight line, a steady arm secured to and insulated from the support and a suspension member from the outer end to the cable clamp to support the end of the arm and an auxiliary arm pivotally secured to the steady arm at a point between the outer end of the steady arm and the insulating means and having its other end secured to the trolley wire to steady the wire and permit vertical movement of the wire.

2. A trolley system comprising a support, a trolley wire, a messenger cable suspended from the support and extending in both directions from the support, insulating members interposed in a suspension for the messenger cable from the support and a cable clamp secured to the suspension and the messenger cable, hangers for suspending the trolley wire from the cable and disposed along the messenger cable at predetermined points and secured to the cable and trolley wire and of varying lengths to maintain the trolley wire in a substantially straight line, a steady arm secured to and insulated from the support and a suspension member from the outer end to the cable clamp to support the end of the arm and an auxiliary arm pivotally secured to the steady arm at a point between the outer end of the steady arm and the insulating means and having its other end secured to the trolley wire to steady the wire and permit vertical movement of the wire and steadying cables extending from the outer end of the steady arm in both longitudinal directions and secured to the messenger cable at points distant from the cable clamp.

3. A trolley system comprising a support, a trolley wire, a messenger cable, means to suspend the cable below the support in insulated relation thereto and a cable clamp securing the cable to the suspending means, means suspending the trolley wire from the cable and means to steady the trolley wire from lateral swinging comprising a steady arm having one end secured to the support in insulated relation thereto and the outer end flexibly suspended from the cable clamp permitting vertical movement of the said outer end, and a pivotally mounted arm secured to the trolley wire and the steady arm intermediate the ends thereof to prevent swaying of the trolley wire.

4. A trolley system comprising a support, a messenger cable suspended below the support by an insulator, a trolley wire suspended from the messenger cable on either side of the insulator, a steady arm having one end pivotally secured to the support, means to flexibly suspend the other end, means to prevent lateral swing to the end of the steady arm, and an auxiliary arm pivotally mounted on the steady arm intermediate its ends and secured to the trolley wire.

5. A catenary system comprising a steady arm rigidly secured to insulating means comprising one or more insulating units fixedly secured together and pivotally to a support, means to flexibly support the outer end of the arm, an auxiliary arm pivotally secured at one end to the steady arm and the other end pivotally secured to a trolley wire, a messenger cable suspended from the support and means suspending the trolley wire from the messenger cable.

6. A catenary system comprising a support, a steady arm comprising an arm and a plurality of separate insulating units rigidly secured together and secured to the support at one end, means to suspend the opposite end, a trolley wire, an auxiliary arm pivotally secured to the steady arm intermediate its ends and to the trolley wire, a messenger cable, means suspending the cable from the support and means suspending the trolley wire from the cable.

In testimony whereof I affix my signature.

SAMUEL S. MATTHES.